United States Patent [19]

Takayanagi

[11] Patent Number: 5,257,115
[45] Date of Patent: Oct. 26, 1993

[54] IMAGE RECORDING APPARATUS USING PSEUDO TONE GENERATED IMAGES

[75] Inventor: Hiroshi Takayanagi, Kanagawa, Japan

[73] Assignee: Fuji Xerox Co., Ltd., Tokyo, Japan

[21] Appl. No.: 595,614

[22] Filed: Oct. 10, 1990

[51] Int. Cl.$^5$ .............................................. H04N 1/40
[52] U.S. Cl. ................................... 358/455; 358/456; 358/401
[58] Field of Search ............... 358/456, 443, 451, 455, 358/448, 457, 458, 459, 296, 401; 382/50, 56

[56] References Cited

U.S. PATENT DOCUMENTS

| | | | |
|---|---|---|---|
| 4,032,978 | 6/1977 | Wong | 358/456 |
| 4,827,353 | 5/1989 | Ehlers et al. | 358/451 |
| 5,101,443 | 3/1992 | Behrmann et al. | 358/451 |

*Primary Examiner*—Edward L. Coles, Sr.
*Assistant Examiner*—Jerome Grant, II

*Attorney, Agent, or Firm*—Finnegan, Henderson, Farabow, Garrett & Dunner

[57] ABSTRACT

An image recording apparatus is disclosed. An image input device reads in graphic information and outputs the read-in graphic information as multi-tone image data. A pseudo tone generating device reduces the number of tones in the multi-tone image data from the image input device by processing a group of multi-tone image data to produce pseudo tone image data. An image printing device performs printing based on the pseudo tone image data generated by the pseudo tone generating device, the pseudo tone generating device being incorporated in the image printing device. The apparatus can also include an image storage device, for temporarily storing the pseudo tone image data generated by the pseudo tone generating device. The image printing device prints the pseudo tone image data stored in the image storage device.

10 Claims, 11 Drawing Sheets

| FILE NAME | FILE NUMBER | IMAGE DATA STRUCTURE | PROCEDURE OF TREATMENT | DATA QUANTITY | IMAGE DATA | END OF DATA | ETC. |

IMAGE DATA STRUCTURE: RESOLVING POWER | TONE NO. | CHROMATIC STRUCTURE | PRESENCE OR ABSENCE OF PHOTOGRAPHIC MODE DESIGNATION

PROCEDURE OF TREATMENT: COPY NO. | DUPLEX COPY | STAPLING | SPECIAL TREATMENT

DATA QUANTITY: FS BYTE NO. | SS BYTE NO. | PAGE NO.

TONE NO. SELECTION SIGNAL FROM CPU

IMAGE RECORDING APPARATUS USING PSEUDO TONE GENERATED IMAGES

BACKGROUND OF THE INVENTION

1. Field of the Invention

The present invention relates to an image recording apparatus for printing a multi-tone image. More particularly, the present invention relates to an image-storage-type image recording apparatus in which image data is stored once before printing. Discussion of the Related Art A digital image-storing electrophotographic copying apparatus, shown for example in FIG. 15, includes an image input device 200 for reading documents, an image storage device 201 for temporarily storing image data DT read by the image input device 200, and an image printer 202 for performing printing according to an electrophotographic process based on the image data DT stored in the image storage device 201. This type of apparatus can have multiple functions, such as an electronic recirculating document handler function, a reverse output function, a sample copy function, and the like.

In the digital image-storage electrophotographic copying apparatus, the quantity of data (the number of tones) per pixel of the image data DT stored in the image storage device 201 for printing a multi-tone image must be small because of the limited memory capacity of the image storage device 201.

However when the number of tones in the original input image data DT is small, the picture quality in the print output is deteriorated.

Figure 15:
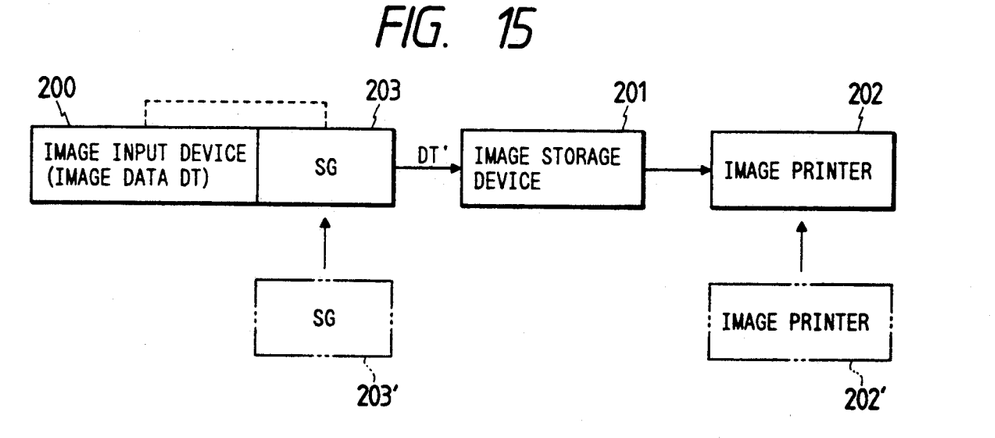
FIG. 15 is a block diagram showing an example of the conventional apparatus.

To improve picture quality in the conventional apparatus, a pseudo tone generating circuit (hereinafter called "screen generator") 203 is inserted between the image input device 200 and the image storage device 201. The screen generator 203 reduces the number of tones in the image data DT. At the same time, screen generation is made. That is, pseudo tone image data DT' equivalent to the tone characteristic of the actual document image is generated. Subsequently, the pseudo tone image DT' is stored in the image storage device 201. The image printer 202 prints the pseudo tone image data.

In the digital image-storage electrophotographic copying apparatus, the screen generator 203 must match with the image printer 202, because the screen generator 203 substantially corrects the characteristic of the image printer 202.

In the apparatus in which the screen generator 203 is arranged in the side of the image input device 200, another image printer 202', different in speed and function (duplex copy, aftertreatment, etc.) as shown in the drawing, cannot be connected to the image input device 200 and the image storage device 201 used in common. Accordingly, a variation of the apparatus in which a new image printer is connected cannot be accomplished easily. This creates a technical problem in that an image input device 200 having a screen generator 203' matching with the new image printer 202' must be prepared anew.

It is a matter of course that the same problem arises in other image recording apparatus.

SUMMARY OF THE INVENTION

The present invention has been made in view of the above circumstances and has as an object to provide an image recording apparatus in which variations of the apparatus can be easily produced by simply connecting various image printing means different in speed and function to a common image input means and a common image storage means.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the object and in accordance with the purpose of the invention, as embodied and broadly described herein, according to an aspect of the present invention, the image recording apparatus of the present invention comprises an image input means for reading-in graphic information and for outputting the read-in graphic information as multi-tone image data; a pseudo tone generating means for reducing the number of tones in the image data from the image input means and for carrying out a pseudo tone processing upon a group of image data to approximate the number of tones of the image data to the tone characteristic of the graphic information; and an image printing means for performing printing based on the pseudo tone image data stored in the image storage means, the pseudo tone generating means being incorporated in the image printing means.

The invention may include image storage means for temporarily storing pseudo tone image data.

Preferably, communication protocol between the pseudo tone generating means and the image storage means and communication protocol between the image storage means and the image printing means are made to be substantially the same, and an image output portion of the pseudo tone generating means and an image input portion of the image printing means are made to be substantially the same in construction.

Preferably, the pseudo tone generating means includes a tone number changing portion for setting the number of reduction tones variably.

BRIEF DESCRIPTION OF THE DRAWINGS

The accompanying drawings, which are incorporated in and constitute a part of this specification illustrate preferred embodiments of the invention and, together with the description, serve to explain the objects, advantages and principles of the invention.

In the drawings.

DETAILED DESCRIPTION OF THE PREFERRED EMBODIMENTS

Figure 1:
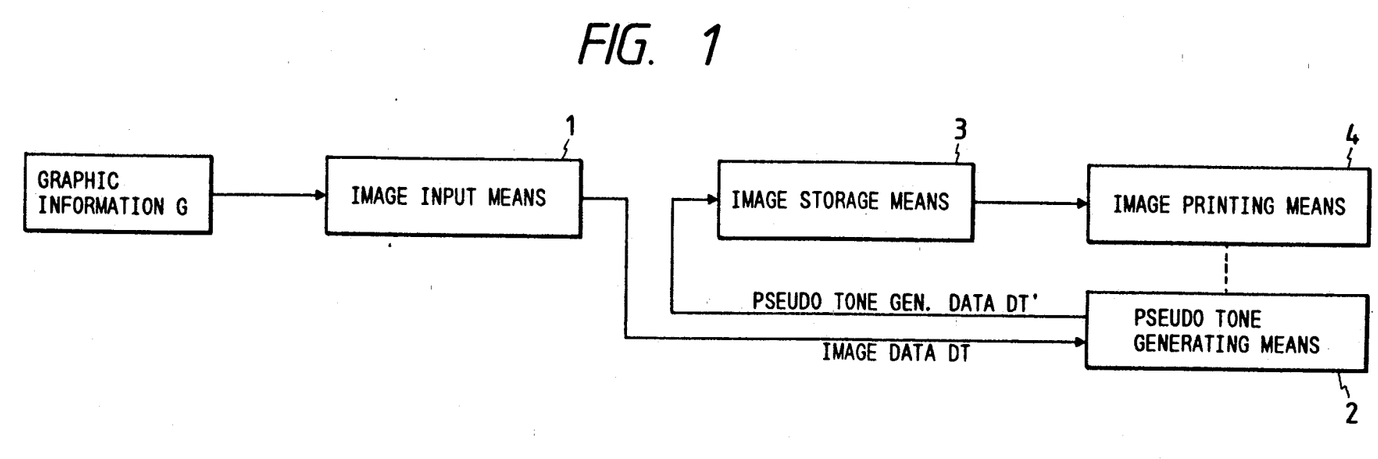
FIG. 1 is a block diagram showing the outline of the digital electrophotographic copying apparatus according to the present invention.

First, referring to FIG. 1, the outline of the digital electrophotographic copying apparatus according to the present invention will be described.

According to the present invention, the image recording apparatus comprises an image input means 1 for reading-in graphic information G and for outputting the read-in graphic information as multi-tone image data DT; a pseudo tone generating means 2 for reducing the number of tones in the image data DT from the image input means 1 and for carrying out a pseudo tone processing upon a group of image data DT to approximate the number of tones of the image data DT to the tone characteristic of the graphic information G; an image storage means 3 for temporarily storing pseudo tone image data DT' generated by the pseudo tone generating means 2; and an image printing means 4 for performing printing based on the pseudo tone image data DT' stored in the image storage means 3, the pseudo tone generating means 2 being incorporated in the image printing means 4.

In the above apparatus according to the invention, as to the image input means 1, any suitable means, such as a document reading scanner, a workstation, a personal computer, or the like, may be used so long as multi-tone image data DT can be obtained.

Further, as to the pseudo tone generating means 2, any suitable means may be used so long as the means can generate pseudo tone image data DT' smaller in the number of tones than the input image data DT. As to a method used in the pseudo tone generating means, any suitable method may be selected from known methods such as a screen pattern and error diffusion method, a dither method, and the like.

As to the image storage means 3, any suitable means may be used so long as the pseudo tone image data DT, can be stored. From the viewpoint of storage efficiency, it is preferable that data compressed according to a predetermined compression algorithm are stored in a hard disk device or the like and are expanded according to a predetermined expansion algorithm.

As to the image printing means 4, any suitable means, such as an electrophotographic process type, an image thermal transfer type, an ink-jet type, or the like, may be used so long as multi-tone images can be printed. As to print format in the image printing means 4, color printing as well as monochrome printing can be made. For example, in the case of color printing, the image writing means are respectively provided for the used colors, so that image data to be printed can be cut and separated by using color flags (or the like) for the respective image writing means.

As described above, the pseudo tone generating means 2 is incorporated in the image printing means 4. In order to make it possible to produce a simple image recording apparatus by removing the image storage device, it is preferable that the communication protocol between the pseudo tone generating means 2 and the image storage means 3 and the communication protocol between the image storage means 3 and the image printing means 4 are made to be substantially the same and that an image output portion of the pseudo tone generating means 2 and an image input portion of the image printing means 4 are made to be substantially the same in construction.

The number of thresholds (the number of reduction tones) in the pseudo tone generating means 2 may be fixed. However, to accommodate other image printing means 4 used in common with the image storage means 3, it is preferable to have the ability to variably set the number of thresholds in the pseudo tone generating means 2 incorporated in the image printing means 4 according to the high quality and high speed requirements of the image printing means 4.

The operation of the apparatus according to the invention is as follows.

The image input means 1 reads graphic information G and sends out multi-tone image data DT. The multi-tone image data DT are received in the pseudo tone generating means 2 incorporated in the image printing means 4 so that pseudo tone image data DT', subjected to the tone number reduction and pseudo tone processing, are generated from the pseudo tone generating means 2 based on the image data DT.

The pseudo tone image data DT' are fed to the image storage means 3 and further fed to the image printing means 4 in a substantially reverse-S route through the image storage means 3.

The present invention will be described in detail as to the preferred embodiments thereof illustrated in the accompanying drawings.

I. Outline of the Apparatus

Figure 2:
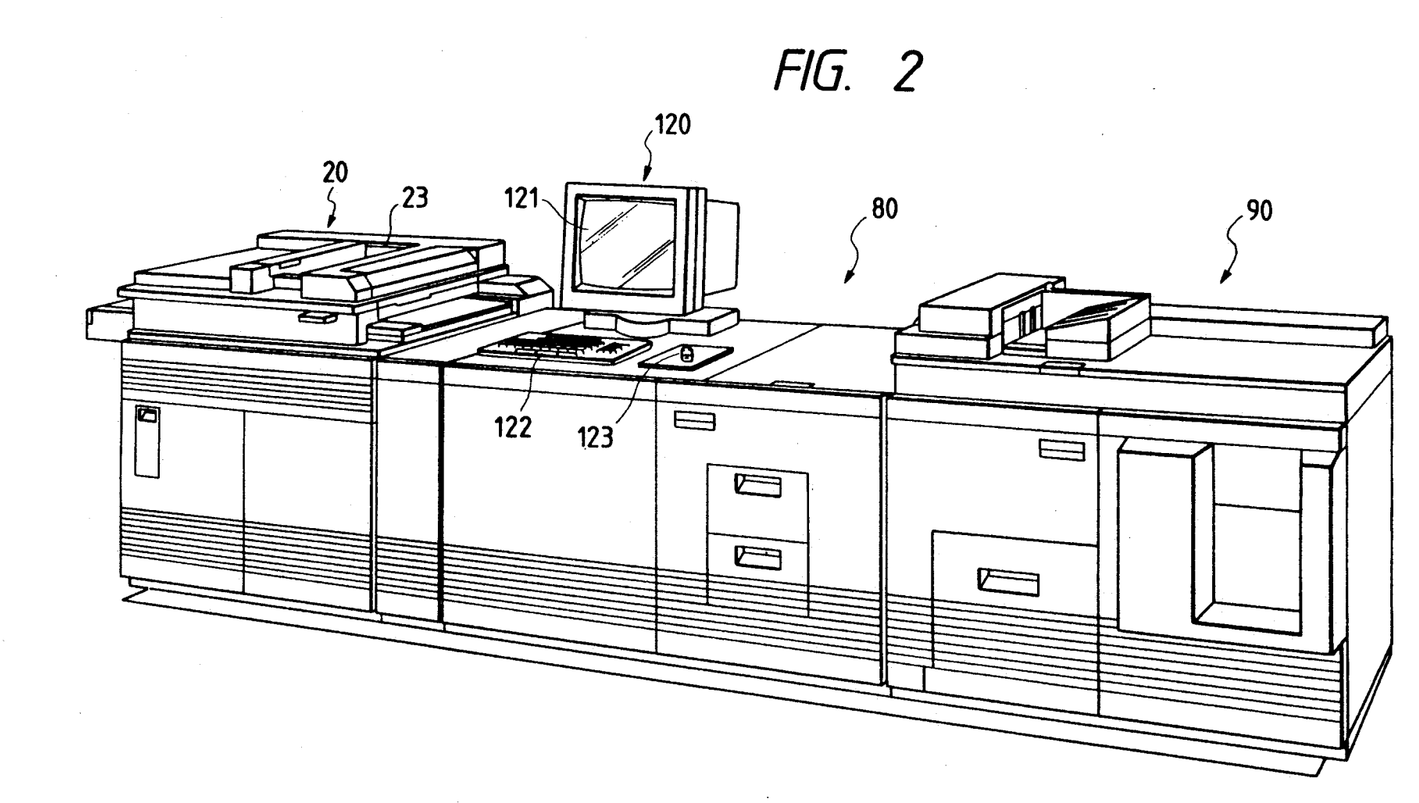
FIG. 2 is a perspective view showing the external appearance of the digital electrophotographic copying apparatus as related to an embodiment thereof.

FIG. 2 is a perspective view showing the outline of a digital electrophotographic copying apparatus according to the present invention. The apparatus has an image input device 20 for reading a document as digital image data DT (which are, in this embodiment, 8-bit image data expressing various halftone images). A tone reproduction controller (hereinafter abbreviated to "TRC") 50 incorporated in an image printer 90 (which will be described later) corrects the image data DT of the image input device 20 corresponding to the reproduced image density characteristic. A screen generator (hereinafter abbreviated to "SG") 60 incorporated in the image printer 90 reduces the number of tones of the image data DT of the TRC 50 to 3 bits to thereby send out the image data DT as pseudo tone image data DT'. An image storage device 80 stores the pseudo tone image data DT' obtained from the SG 60. The image printer 90 performs printing according to an electrophotographic process based on the pseudo tone image data DT' stored in the image storage device 80. User interface 120 designates the contents of a reproduction job and checks the contents of printing. A controller (not shown) correlatively controls the image input device 20, the image storage device 80 and the image printer 90 (including the TRC 50 and the SG 60) in accordance with the instructions supplied through the user interface 120.

In this embodiment, all images are stored once in the image storage device 80. Accordingly, a plurality of copies can be obtained from one document by one scanning operation of the image input device 20. Also a plurality of copies from each of the documents can be obtained by one scanning operation of the image input device, because all the documents are read and successively stored as image data in the image storage device 80 and then the image data are successively read from the image storage device and printed.

II. Constituent Parts of the Apparatus (1) Image Input Device

Figure 3:
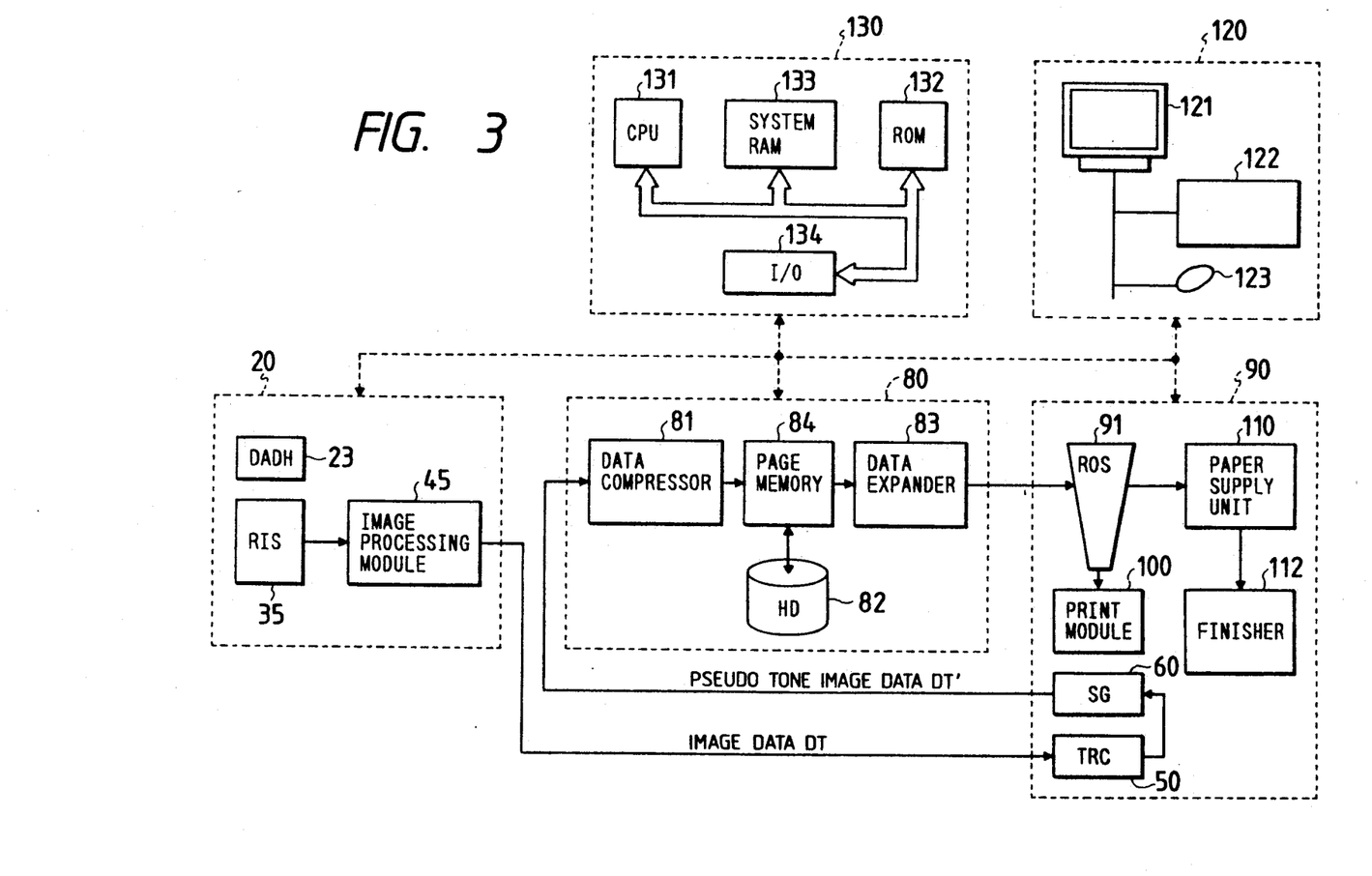
FIG. 3 is a block diagram of the digital electrophotographic copying apparatus as related to an embodiment thereof.
Figure 4:
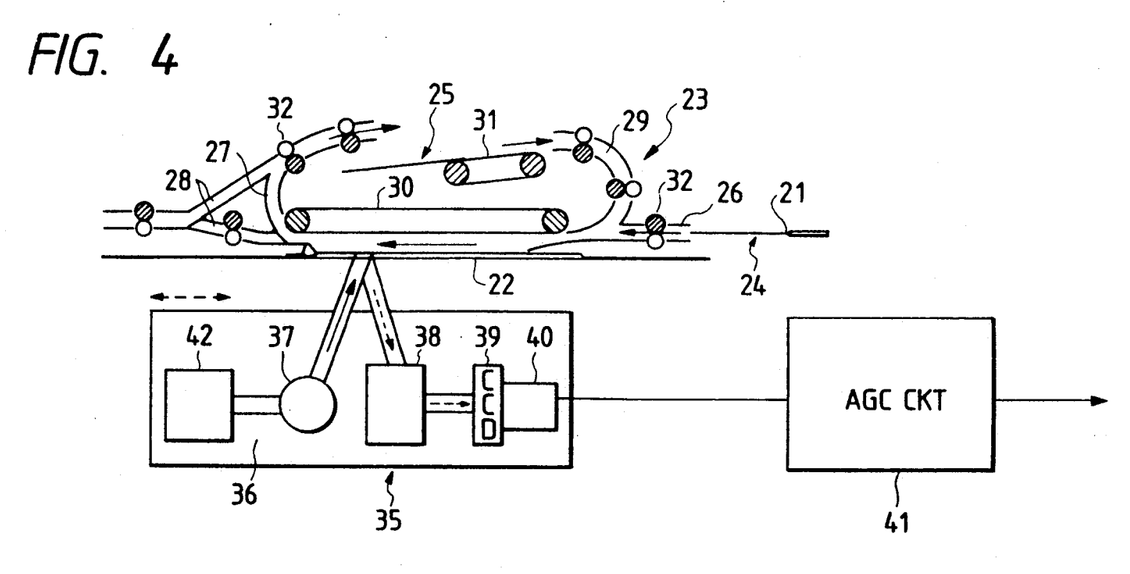
FIG. 4 is an explanatory view showing the details of the DADH and the RIS.

As shown in FIGS. 3 and 4, this device has a duplex automatic document handler (hereinafter abbreviated to "DADH") 23 for successively automatically feeding documents 21 onto a platen 22. A raster input scanner (hereinafter abbreviated to "RIS") 35 reads the documents 21 on the platen 22. An image processing module 45 carries out various kinds of processing (so- called shading correction, ghost correction, ground reveal removal, etc.) and various kinds of editing processes (scale-up and scale-down, italic type, half-tone dot meshing type, white- painted type, shadow type, etc.) upon image data DT from the RIS 35.

In this embodiment, the DADH 23 comprises a document supply path 26 for feeding a document 21 from a document set position 24 toward the platen 22, a document feedback path 27 for feeding back the document 21 from the platen 22 toward a document reception position 25, a document inversion feedback path 28 for feeding back the document 21 from the platen 22 to the document reception position 25 after inverting the document 21, a document re-supply path 29 for feeding the document 21 from the document reception position 25 toward the platen 22 again, a document transport 30 for transporting the document 21 from the document supply path 26 and the document re-supply path 29 onto the platen 22, and feed rolls 31 and feed belts 32 suitably arranged in the respective document feed paths 26 to 29. When a single-sided document 21 is supplied, the document feed paths 26 and 27 are used. When a double-sided document is supplied, the document feed paths 26 and 28 are used first and then the document feed paths 29 and 27 are used.

The RIS 35 has a scanning fluorescent lamp 37 mounted onto a scanning carriage 36 moving along one side of the platen 22, so that light from the moving fluorescent lamp 37 is radiated to the document 21 on the platen 22. Light reflected at the document is led to an image sensor (which, in this embodiment, is constituted by a charge coupled device [CCD]) 39 through a suitably arranged optical system 38. The image data read by the image sensor 39 are sent to an automatic gain control circuit 41 through a sensor interface 40 and then fed to the image processing module 45 after suitable gain control.

In FIG. 4, the reference numeral 42 designates a lamp heater for performing temperature control for the fluorescent lamp 37.

(2) Tone Reproduction Controller (TRC) and Screen Generator(SG)

(a) TRC

Figure 5:
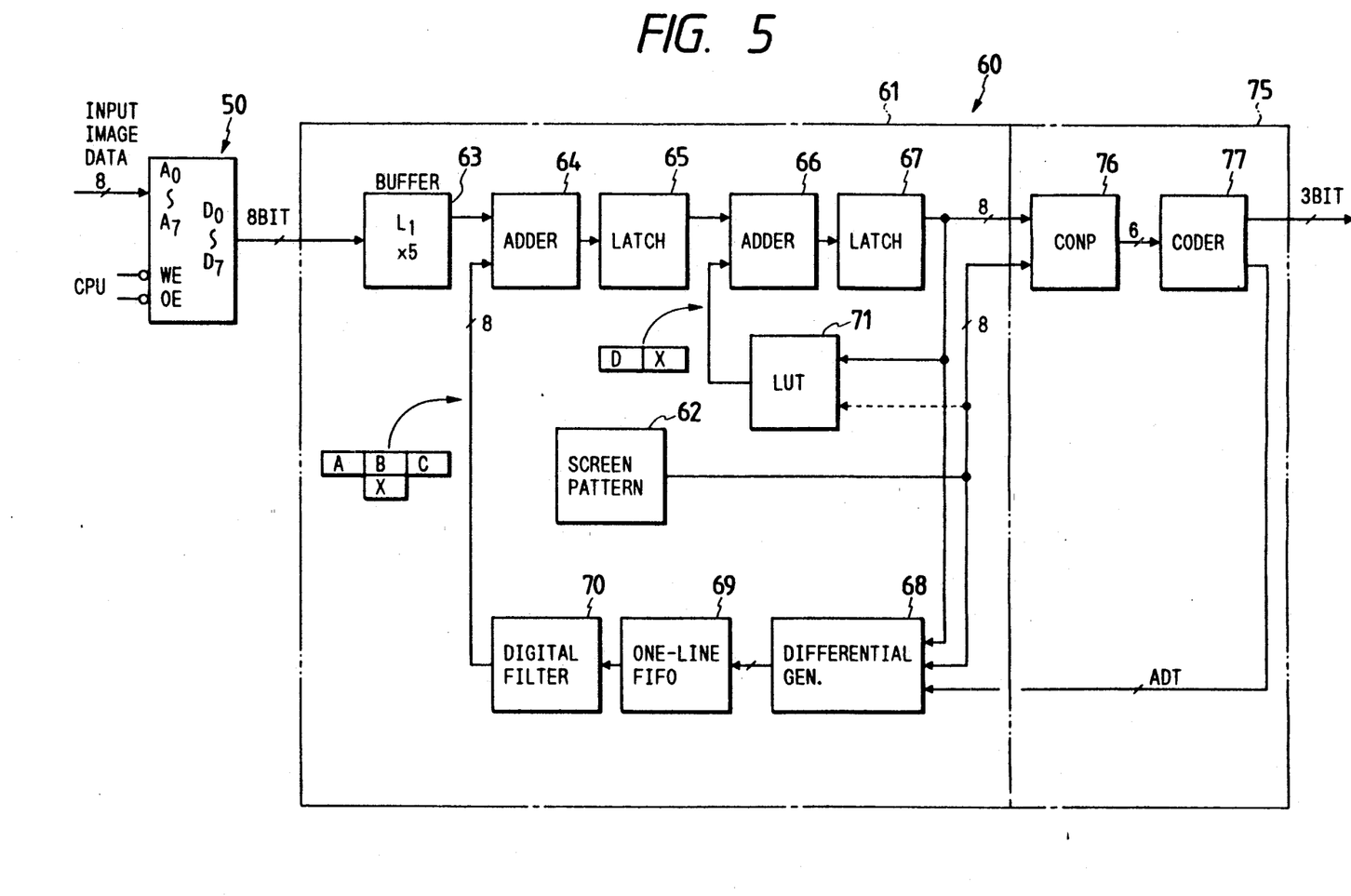
FIG. 5 is a schematic showing the details of the TRC and the SG.

In FIGS. 3 and 5, the TRC 50 includes a look-up table for correcting input image data DT based on predetermined image-reproduction density characteristic (which corresponds to development density characteristic of a developer 103 as will be described later). The TRC 50 has input ports $A_0$ to $A_7$ for receiving 8-bit input image data DT as an address signal, and output ports $D_0$ to $D_7$ for sending out conversion data DT.

When the level at an OE port is tuned to a high level according to an instruction signal from a CPU 131 (which will be described later), the TRC 50 performs an ordinary converting operation. When the level at a WE port is turned to a high level, the TRC 50 can rewrite data in the table.

(b) SG

The SG 60 used in this embodiment converts image data DT having 256 tones into pseudo tone image data DT' having 7 tones (including a zero-level tone). A typical example of the SG 60 is shown in FIG. 5.

In FIG. 5, the SG 60 comprises an error diffusion circuit 61 and a thresholding circuit 75. When input image data DT are separated by a predetermined threshold according to a screen pattern (equivalent to a threshold pattern) given from a screen pattern setting circuit 62, the error diffusion circuit 61 successively diffuses the influence of differential data (error data) between the image data DT and the threshold. The thresholding circuit 75 compares data from the error diffusion circuit 61 with the screen pattern to thereby perform 7-tone thresholding upon the image data DT.

Figure 6:
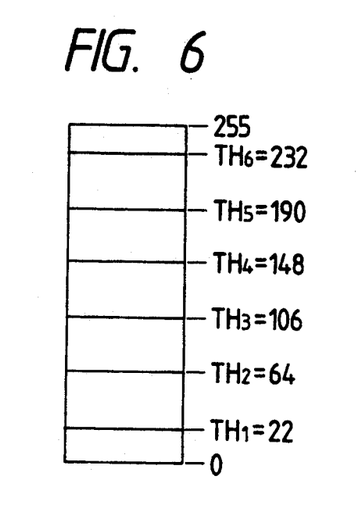
FIG. 6 is an explanatory view showing the theory of setting of thresholds in threshold processing.

The screen pattern setting circuit 62 sets thresholds. In this embodiment, as shown in FIG. 6, the circuit 62 sets six thresholds ($TH_1$ to $TH_6$) for separating 255 tones into 7 tones.

Figure 7:
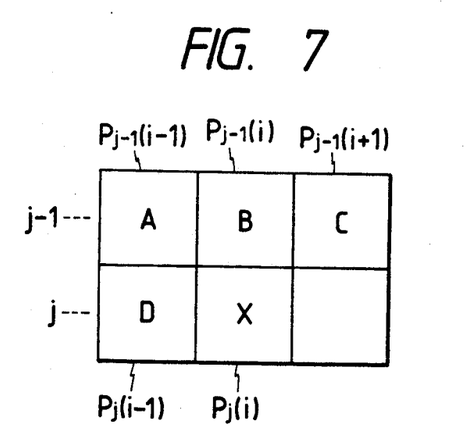
FIG. 7 is an explanatory view showing the algorithm in the error diffusion circuit.

The basic algorithm in the error diffusion circuit 61 is shown in FIG. 7.

In FIG. 7, a corrected image data X, in a target pixel $P_{j(i)}$ arranged in the j-th line and the i-th column is calculated based on the formulae:

$$\Delta X = k_1 A + k_2 B + k_3 C + k_4 D$$

where $$\Sigma k_i (i=1 \text{ to } 4) = 1 \quad (1)$$

$$X' = X + \Delta x \quad (2)$$

in which X represents the data of the target pixel $P_{j(i)}$, A, B and C represent differential data between the target pixel $P_{j(i)}$ and pixels $P_{j-1(i-1)}$, $P_{j-1(i)}$ and $P_{j-1(i+1)}$ respectively arranged in the (j−1)-th line and the (i−1)-th, i-th and (i+1)-th columns, D represents a differential data between the target pixel $P_{j(i)}$ and a just prior pixel $P_{j(i-1)}$), $\Delta X$ represents a differential correction data, and $k_1$ to $k_4$ represent correction coefficients for weighting the differential data between the target pixel and the respective pixels corresponding to the degree of influence thereof. In the following, the error diffusion circuit 61 and the thresholding circuit 75 are described in detail.

In the error diffusion circuit 61 in FIG. 5, the reference numeral 63 designates a buffer for temporarily storing image data DT from the TRC 50. Reference numeral 64 designates a summer receiving 8-bit image data DT from the buffer 63 into one input terminal. Reference numeral 65 designates a latch circuit for storing the output data from the summer 64 and then sending out the data. Reference numeral and 66 designates a summer receiving the output data from the latch circuit 65 into one input terminal. The reference numeral 67 designates a latch circuit for once storing the output data from the summer 66 and then sending out the data. The output data from the latch circuit 67 is fed to the thresholding circuit 75.

The reference numeral 68 designates a differential generating circuit which receives corrected image data X', screen pattern data and address data ADT as input data respectively from the latch circuit 67, the screen pattern setting circuit 62 and a coder 77 (which will be described later) and generates differential data (as represented by A, B and C in FIG. 7) to the one-line FIFO 69. After the differential data from the differential generating circuit 68 are stored in a one-line FIFO 69, the differential data between the target pixel and the correction pixels are taken in a digital filter 70. The digital filter 70 carries out an arithmetic operation using the differential data A, B and C in the correction pixels, generating a correction data represented by $k_1A+k_2B+k_3C$. The correction data is given to the other input terminal of the summer 64.

The reference numeral 71 designates a look-up table which receives corrected image data X' and screen pattern data as input data respectively from the latch circuit 67 and the screen pattern setting circuit 62, and generates a correction data $k_4D$ in the pixel just prior to the target pixel. The correction data $k_4D$ from the look-up table 71 is given to the other input terminal of the summer 66.

In the thresholding circuit 75 in FIG. 5, the reference numeral 76 designates six digital comparators. The digital comparators receive respective thresholds of corrected image data and screen pattern data from the error diffusion circuit 61. When the corrected image data received in the respective digital comparator 76 is larger than the threshold, the digital comparator 76 generates a high-level signal.

From each of the comparators 76, 6-bit address data ADT are fed to the coder 77 in which the 6-bit data are converted into 3-bit pseudo tone image data DT'.

(3) Image Storage Device

In FIG. 3, the image storage device 80 comprises a data compressor 81 for compressing pseudo tone image data DT' from the SG 60 according to a known compression algorithm. Hard disk device 82 stores the image data DT' compressed by the data compressor 81 as an image data file (Refer to FIG. 8). Data expander 83 expands the compressed image data DT' stored in the hard disk device 82 according to a known expansion algorithm. Page memory 86 serves as a buffer for temporarily storing image data DT' of one-page when the image data DT' from the data compressor 81 is stored in the hard disk device 82 or when the image data DT' from the hard disk device 82 is transferred to the data expander 83.

Figure 8:
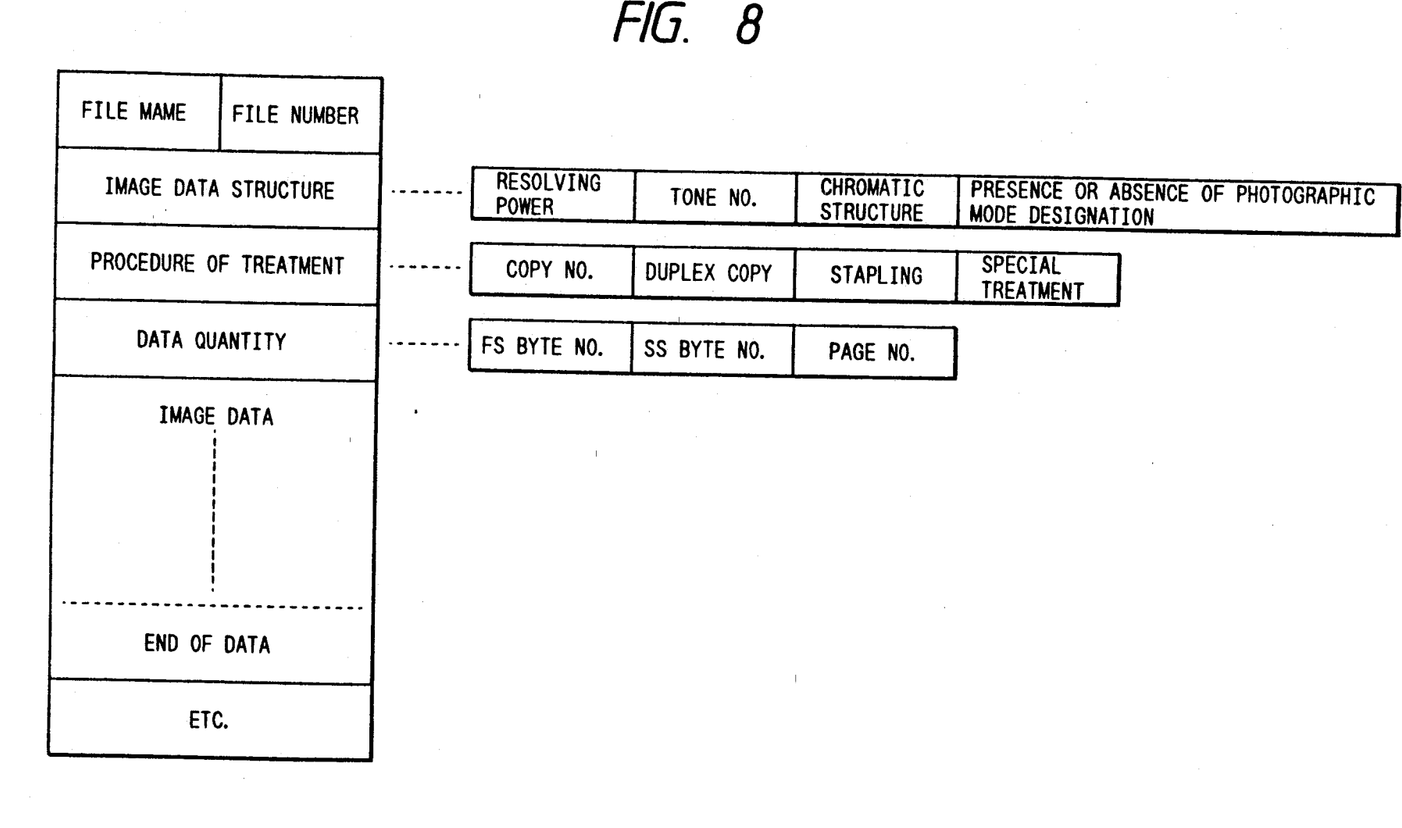
FIG. 8 is an explanatory view showing an example of the image data file.

In this embodiment, information concerning the attributes of the image data file, as well as the image data file, are stored as coded information in the hard disk device 82. As another method, the attribute information may be stored in a memory provided independently of the hard disk device 82 after the image data file and the attribute information are referenced to each other to make a pair.

As shown in FIG. 8, the image data attribute information consists of the image data structure [the resolving power in each page, the number of tones, the chromatic structure (color or monochrome), the presence or absence of photographic mode designation, etc.], the procedure of treatment [the number of copies, duplex (double-side) copy, stapling, special treatment], the quantity of data [the number of effective bits or byes (equivalent to page size) in the fast scanning direction (main scanning direction) and slow scanning direction (auxiliary scanning-direction), the number of pages], and the like [the data of reading, etc.].

In this embodiment, the image data file stored in the hard disk device 82 is printed out based on the attribute information by the image printer 90 according to processing designated by the user interface 120, such as the electronic RDH, scale-up or scale-down to designated magnification, the number of copies, double-sided/single-sided, stapling, tape binding, and the like. When the image data file has been printed out, that is, when the image data file becomes disused, the image data file as well as the attribute information is erased.

(4) Image Printer

In FIG. 3, the image printer 90 comprises a raster output scanner (hereinafter abbreviated to "ROS") 91 for generating an optical image based on the pseudo tone image data DT' from the data expander 83, a printing modul3 100 for forming a latent image corresponding to the optical image generated by the ROS 91 and for making the latent image visible on recording paper, a paper supply unit 110 for supplying recording paper to the printing module 100 in synchronism with the writing timing of the ROS 91, and a finisher 112 for carrying out suitable after-processing (such as stapling, tape binding, etc.) upon a bundle of printing paper when the printing operation of the printing module 100 is finished. As described above, the image printer 90 further includes the TRC 50 and the SG 60.

The image printer 90 has an output connector for giving the output of the SG 60 to the outside or into the ROS 91, and an input connector for receiving the image data DT from the image storage device 80.

Figure 9:
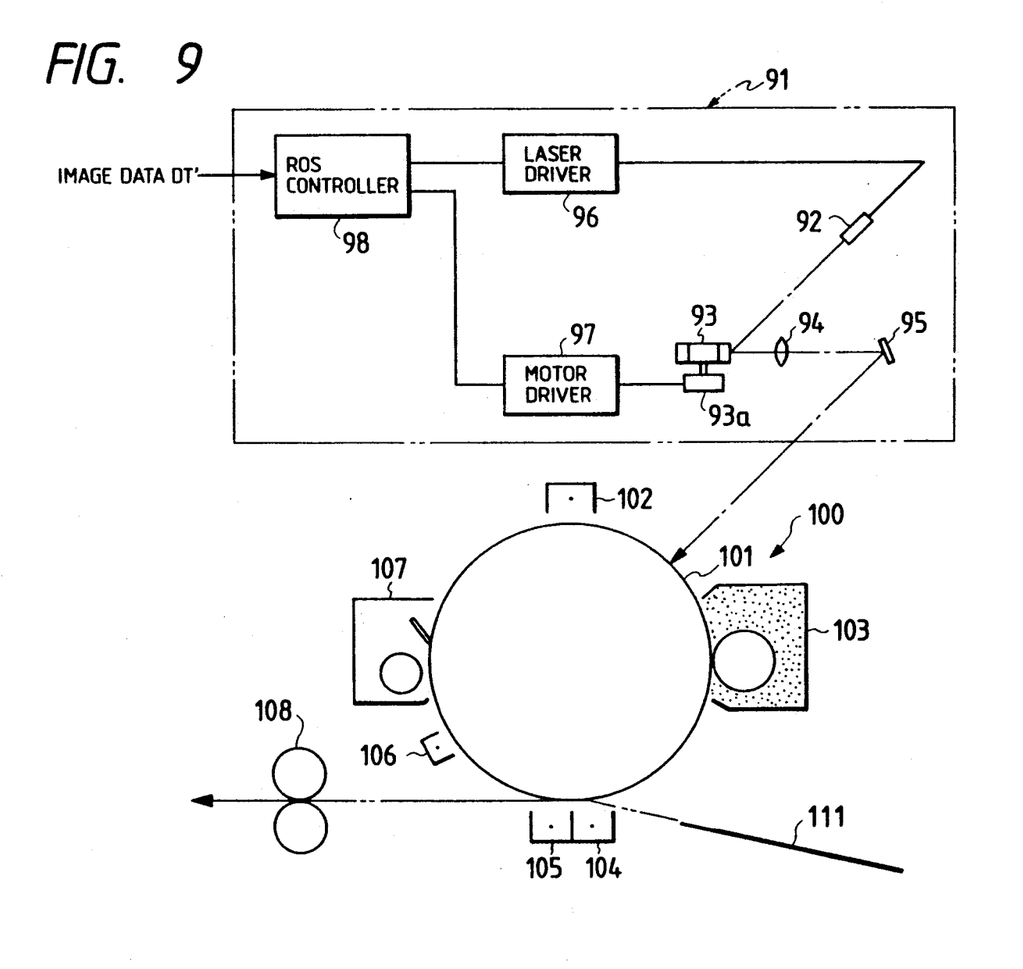
FIG. 9 is an explanatory view showing the details of the ROS and the printing module.

In this embodiment, the ROS 91 and the printing module 100 are constituted as shown in FIG. 9.

In FIG. 9, the reference numeral 92 designates a semiconductor laser. Reference numeral 93 designates a polygon mirror for deflecting beams from the semiconductor laser 92 in a predetermined scanning range. Reference numeral 94 designates an imaging lens for converging the beams deflected by the polygon mirror 93 to form an image along a scanning line on a photosensitive drum 101 which will be described later. Reference numeral 95 designates a reflection mirror for leading the beams to the scanning line position on the photosensitive drum 101. Reference numeral 96 designates a laser driver for driving the semiconductor laser 92. Reference numeral 97 designates a motor driver for driving a drive motor 93a of the polygon mirror 93. Reference numeral 98 designates an ROS controller for giving a predetermined control signal to the laser driver 96 and the motor driver 97 based on the pseudo tone image data DT' from the image storage device 80.

Figure 10:
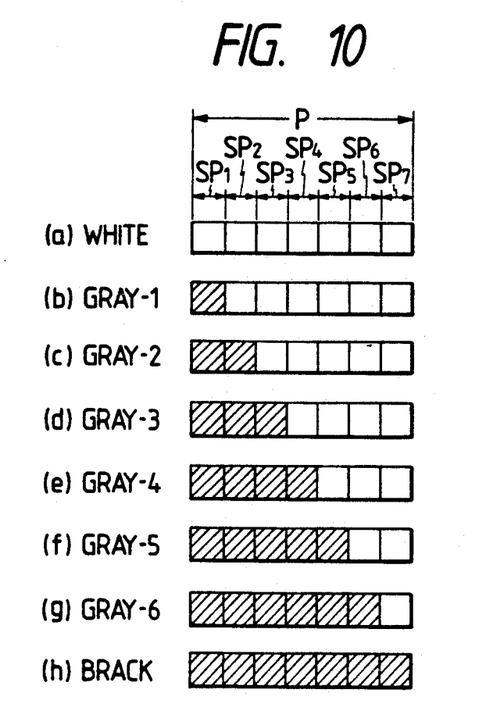
FIG. 10 is an explanatory view showing the operation of the ROS controller.

In this embodiment, the ROS controller 98 separates one pixel P into sub-pixels SP1 to SP7 corresponding to the number of tones (7 tones: 3 bits) of the pseudo tone image data DT' from the image storage device 80 as shown in FIG. 10 and lightens suitable ranges of the sub-pixels SP1 to SP7 to form pulse widths for the respective tones (white, gray 1, gray 2, . . . , gray 6, and black) to thereby perform pulse-width modulation for the driving signal to the semiconductor laser 92.

Further, the reference numeral 101 designates a photosensitive drum having a photoconductive photoreceptor layer formed on its outside. Reference numeral 102 designates an electrification corotron for preliminarily electrifying the photosensitive drum 101. Reference numeral 103 designates a developer for performing toner development on the latent image (negative latent image in which the electric potential of the image portion is lower than that of the background portion or positive latent image in which the electric potential of the image portion is higher than that of the background portion) written on the photosensitive drum 101 by the ROS 91. Reference numeral 104 designates a transfer corotron for electrifying printing paper 111 given from the paper supply unit 110 to thereby transfer the toner image on the photosensitive drum 101 to the printing paper 111. Reference numeral 105 designates a separation corotron for separating the printing paper 111 from the photosensitive drum 101 when the transfer processing is finished. Reference numeral 106 designates an electricity removing corotron for removing electric charges remaining on the photosensitive drum 101. Reference numeral 107 designates a cleaner for removing toner remaining on the photosensitive drum 101. Reference numeral 108 designates a thermal-fixing-type fuse for heating and fixing the toner image transferred to the printing paper 111.

Figure 11:
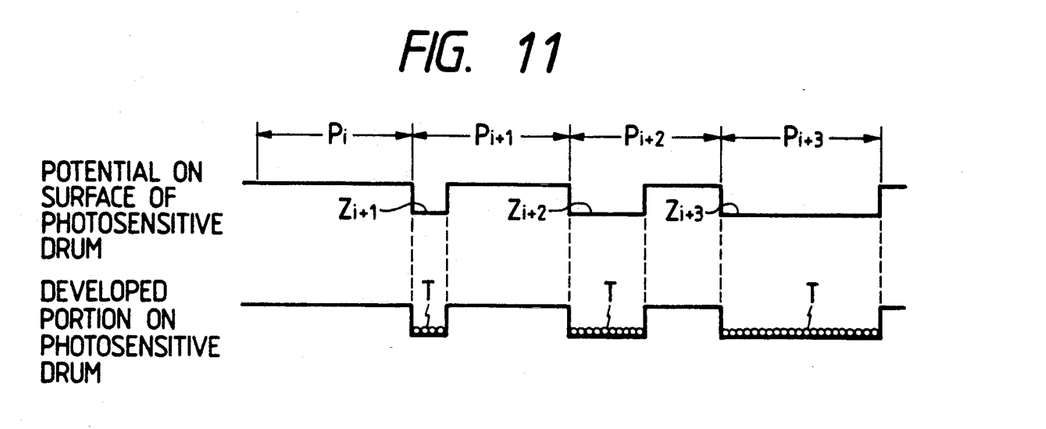
FIG. 11 is an explanatory view showing the image forming processing in the printing module.

In the printing module 100, as shown in FIG. 11, negative latent images $Z_{i+1}$, $Z_{i+2}$ and $Z_{i+3}$ having different pulse widths for respective pixels $P_{i+1}$, $P_{i+2}$ and $P_{i+3}$ are formed on the photosensitive drum 101 by the ROS 91. The negative latent images Z are developed by the developer 103 into visible toner images T having predetermined pulse widths.

(5) User Interface

In FIGS. 2 and 3, the user interface 120 has a CRT display 121 for displaying job programs and the like, a control board 122 for indicating the job programs and the like, and a mouse 123 for indicating the designated position on the CRT display 121.

(6) Controller

In FIG. 3, the controller 130 comprises a CPU 131 for generally controlling the image input device 20, the image storage device 80 and the image printer 90 (including the TRC 50 and the SG 60) according to the instructions from the user interface 120, an ROM 132 for preliminarily storing various kinds of programs conducted by the CPU 131, a system RAM 133 for storing rewritable data for the purpose of data exchange with respect to the CPU 131, and an I/O interface 134 for connecting the CUP 131 to an external apparatus.

In this embodiment, starting programs for starting respective devices, job progression programs for executing jobs in respective devices, failure control programs for controlling failures in respective devices, and the like, are preliminarily stored in the ROM 132.

III. Operation of the Apparatus

Figure 12:
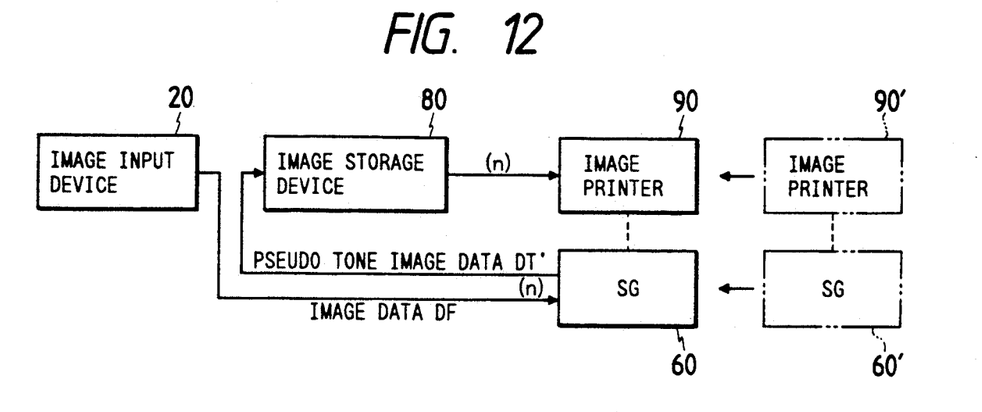
FIG. 12 is a block diagram showing the operation of the apparatus as related to an embodiment of the invention and the production of variations of the apparatus.

When a document is read by the image input device 20 in this embodiment, the image input device 20 sends out 8-bit image data DT for each pixel as shown in FIG. 12.

The image data DT is fed to the TRC (not shown in FIG. 12) and the SG 60 included in the image printer 90. 3-bit pseudo tone image data DT' are sent out from the SG 60 and once stored in the hard disk device 82 of the image storage device 80.

When a job is finished, a new job is started with the image printer 90 performing a predetermined processing per the attribute information of the image data file.

In the case where an image printer 90' different in speed and function is required to be connected to the image input device 20 and the image storage device 80 in the aforementioned apparatus, the image printer 90' can be directly connected thereto with no change of the image input device 20 if an SG 60' matching with the image printer 90' is installed in the image printer 90' in advance. In short, various image printers 90 can be easily connected to the image input device 20 and the image storage device 80 used in common to them. Consequently, apparatus having various image printers 90 can be produced very easily.

IV. Modifications of the Apparatus

Although the aforementioned embodiment has shown the case where the number of tones in the pseudo tone image data DT' obtained from the SG 60 is fixed, the invention can be applied to the case where the number of tones may be variable.

Figure 13:
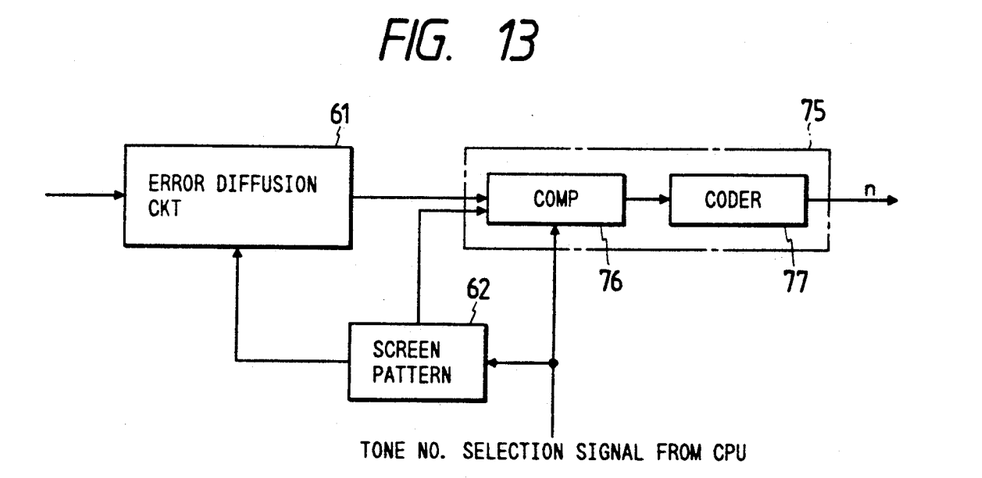
FIG. 13 is a block diagram showing a modification of the SG.

For example, as shown in FIG. 13, an output tone number selection signal M from the CUP 131 may be fed to the respective comparator 76 and the screen pattern setting circuit 62. For example, in the case of tone reproduction in a high quality picture mode, the number of thresholds can be increased to increase the number of bits in the address signal ADT from the comparator 76 and, accordingly, increase the number of bits in the pseudo tone image data DT' from the coder 77 (for example, to 4 bits). In the case of tone reproduction in a high-speed mode, the number of thresholds can be reduced to reduce the number of bits in the address signal ADT from the comparator 76, and reduce the number of bits in the pseudo tone image data DT' from the coder 77 (for example, to 2 bits).

Figure 14:
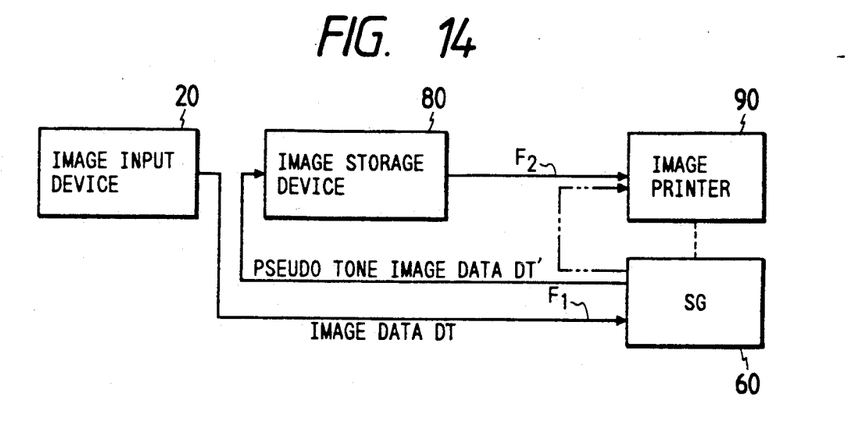
FIG. 14 is a block diagram showing a modification of the apparatus.

Another possible modification is shown in FIG. 14. Communication protocol $F_1$ (clock speed, command/status, and control signals such as line synchronization and the like) between the SG 60 and the image storage device 80 and communication protocol $F_2$ between the image storage device 80 and the image printer 90 may be constructed to be the same. Further, the image output connector portion of the SG 60 and the image input connector portion of the image printer 90 may be constructed in common. In this example, the image output connector portion of the SG 60 can be connected to the image input connector portion of the image printer 90 as shown in the virtual line in FIG. 14, so that a general-use digital electrophotographic copying apparatus not having the image storage device 80 can be produced.

Accordingly, a basic system not having the image storage device 80 can be constructed by detaching the image storage device 80 and can be easily extended to a high-grade system having the image storage device 80 by attaching the image storage device 80.

As described above, according to the present invention, the pseudo tone generating means is incorporated in the image printing means so that image data from the image input means are once stored in the image storage means through the pseudo tone generating means in the side of the image printing means before printing is made by the image printing means. Accordingly, various image printing means different in speed and function can be easily connected to the common image input means and image storage means with no deterioration of multi-tone image reproducibility and with no change of the image input means and image storage means. Consequently, apparatus having various image printing means can be produced easily.

Also, according to the present invention, a system having a detachable image storage means can be constructed. Accordingly, a basic system not having the image storage means can be easily constructed and can be easily extended to a high-grade system having the image storage means.

In addition, a variable number of tones in the pseudo tone image data can be set in the pseudo tone generating means. Accordingly, the pseudo tone image data can be easily generated correspondingly to the high-quality picture mode or high-speed mode.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image recording apparatus, comprising:
   an image input means for reading-in graphic information and for outputting the read-in graphic information as multi-tone image data;
   a pseudo tone generating means, having an image output portion, for reducing the number of tones in said multi-tone image data from said image input means by processing a group of said multi-tone image data to produce pseudo tone image data; and
   an image printing means, having an image input portion, for printing the pseudo tone image data, said pseudo tone generating means being incorporated in said image printing means.

2. The apparatus according to claim 1, further including a first communication protocol between said pseudo tone generating means and said image printing means.

3. The apparatus according to claim 1, wherein the image output portion of said pseudo tone generating means is connectable to the image input portion of said image printing means.

4. The apparatus according to claim 1, wherein said pseudo tone generating means includes a tone number changing portion for variably setting the number of tones in the pseudo tone image data.

5. The apparatus according to claim 1, wherein said image input means is provided separate from said image printing means.

6. The apparatus according to claim 1, further including an image storage means for temporarily storing said pseudo tone image data generated by said pseudo tone generating means.

7. The apparatus according to claim 6, wherein said image printing means prints the pseudo tone image data stored in said image storage means.

8. The apparatus according to claim 6, wherein said image input means and said image storing means are provided separate from said image printing means.

9. The apparatus according to claim 6, further including a second communication protocol between said pseudo tone generating means and said image storage means, and a third communication protocol between said image storage means and said image printing means.

10. The apparatus according to claim 9, wherein said second and third communication protocols are substantially identical.

* * * * *